(No Model.)
O. T. PRISER.
SUPPORT FOR STEW PANS OR LIKE UTENSILS IN DOMESTIC BOILERS.
No. 488,831. Patented Dec. 27, 1892.
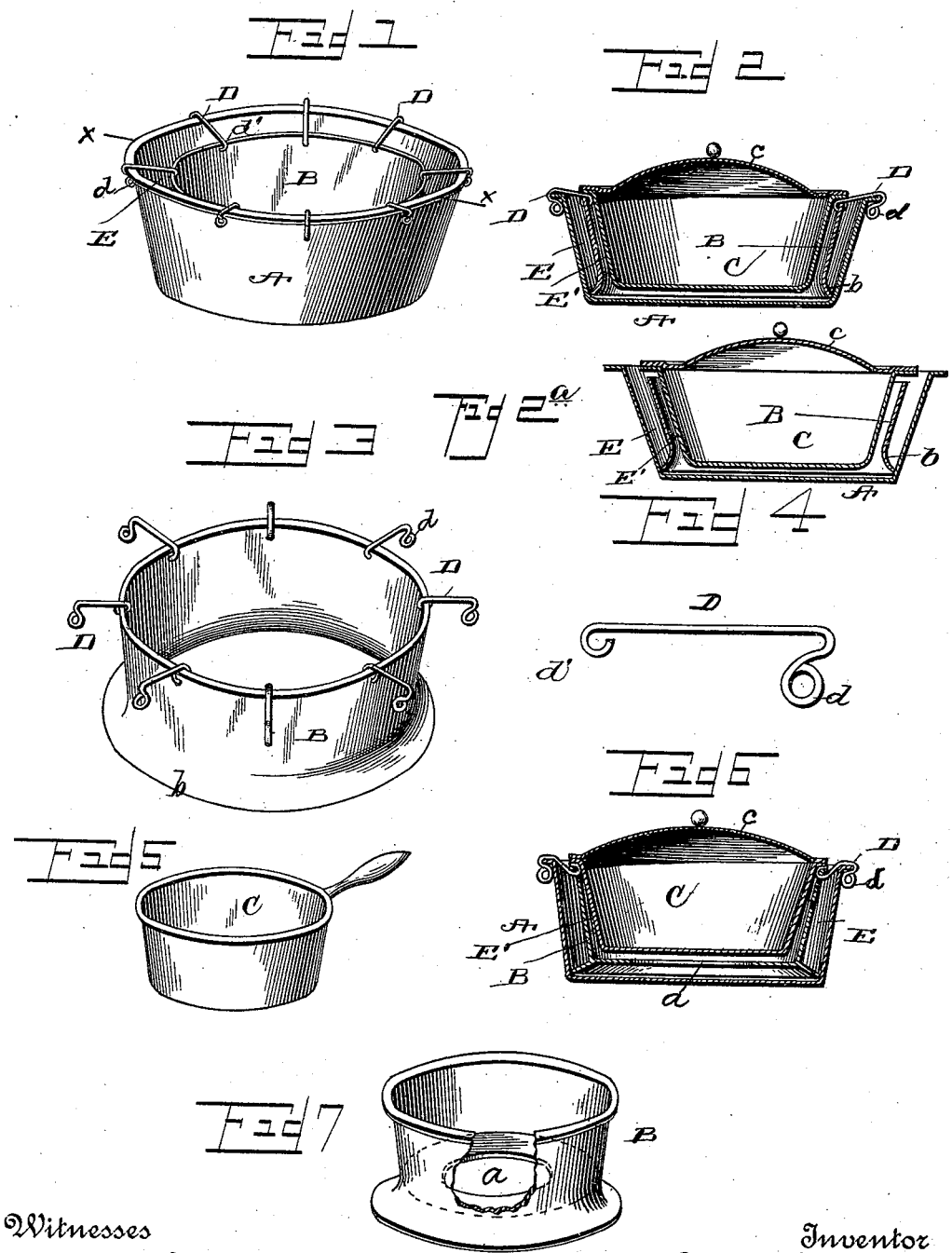

UNITED STATES PATENT OFFICE.

ORION TIMOTHY PRISER, OF BROOKVILLE, OHIO.

SUPPORT FOR STEW-PANS OR LIKE UTENSILS IN A DOMESTIC BOILER.

SPECIFICATION forming part of Letters Patent No. 488,831, dated December 27, 1892.

Application filed February 1, 1892. Serial No. 419,938. (No model.)

*To all whom it may concern:*

Be it known that I, ORION TIMOTHY PRISER, a citizen of the United States, residing at Brookville, in the county of Montgomery and State of Ohio, have invented certain new and useful Improvements in Supports for Stew-Pans or Like Utensils in Domestic Boilers; and I do hereby declare the following to be a full, clear, and exact description of the invention, such as will enable others skilled in the art to which it appertains to make and use the same.

Figure 1.—Is a perspective view showing the pan support in position in an uncovered boiler. Fig. 2.—Is a vertical central section of the device in a covered boiler, the stew pan being in position. Fig. 3.—Is a perspective view of the support detached. Fig. 4.—Is a plan view of the catch or hook. Fig. 5.—Is a perspective view of the stew pan. Figs. 6 and 7, are a sectional, and a detailed perspective view, respectively, of a modification of my invention. Fig. $2^a$, is a sectional view on line $x$—$x$ Fig. 1.

This invention is an improvement in domestic boilers, and the novelty consists in providing a support to be placed inside the boiler upon which a stew pan, or like vessel, is placed, and to which it is not only held in position, but there is afforded a steam chamber about it whereby the article in the pan can be very rapidly cooked without the least danger of getting burned, all as will be hereinafter more fully and clearly set forth as well as pointed out in the claims hereto appended.

In the accompanying drawings A denotes any ordinary metal boiler as used on stoves and for cooking. B is a metal cylinder in shape and size adapted to fit into its receiving boiler, or vessel, so as to reach the bottom of it and come about flush with the edge of the boiler at top. The lower edge $b$ of cylinder B is flared outwardly toward the side of the boiler. This cylinder would, under ordinary circumstances, hold its position when the stew pan C is placed within it so that its bent upper edge rests upon the top edge of B. But to make the cylinder or support B fixed and firm there are provided hooks or catches D of the shape indicated in Fig. 4. These hooks or catches are made of wire and the large bend $d$ at the end is a spring to hook over the upper edge of the boiler, and the small bend $d'$ at the other end is also a spring adapted to fit over upper edge of the cylinder B. It only requires about three of these hooks or catches for real use, but four and more can be used to advantage.

To use the device place the cylinder inside the boiler and apply the hooks to hold the cylinder in place, then put the stew pan in position inside of the cylinder, place its cover $c$ on it and pour a proper quantity of water into the boiler, in the space between its wall and the cylinder. A portion of this will flow under the stew pan. The action of the fire or heat under the boiler will quickly warm the water and the ascending steam in the space between the cylinder and the pan entirely surrounds the sides of the pan and heats the pan and its contents in the most rapid and efficient manner. There will not be a great escape of steam at the top because the rising steam striking against the edges of the cover will be mostly condensed and as water will return to the outer space between the wall of the boiler and the cylinder. Not only will the food in the stew pan be rapidly cooked but there is no danger of burning anything in it not even milk, and but little water will be needed for any ordinary cooking as so much of it is returned by condensation of the rising steam.

The cylinder placed in the boiler in the manner described forms in fact two chambers E, E' within the boiler, the one E more particularly the water chamber and the other E' the steam chamber.

While I have shown in the drawings the ordinary round boiler I do not wish to be confined to that shape, for my invention is equally well adapted for use in connection with a boiler of any shape. Nor is it absolutely necessary that the inside supporting piece conform exactly in shape with the other boiler, for under some circumstances a round interior support could be used to advantage in a square boiler, and so vice versa. Also the boiler or exterior vessel may have bail or handles applied or fixed to it any usual way.

The several parts of the device can be quickly put together in position for use, and on occasion quickly separated. Likewise the device can be very easily kept sweet and clean for there are no spaces or corners for dirt. The device is also very cheap and requires but the slightest mechanical skill for making it in good shape, and ready for efficient service.

In the modification, as disclosed by Figs. 6 and 7, the opening in the bottom of the cylinder is contracted as shown at $a$.

Having described my invention I claim—

1. In combination with a domestic boiler an interior cylinder adapted to rest upon the bottom of the boiler and held in place by catches engaging the upper edge of the boiler, substantially as shown and described.

2. The combination of the boiler A, the cylinder or support B and pan C with the hooks D having spring-hooks at their ends to engage the boiler and the cylinder or support, near their upper edges in the manner and for the purposes set forth.

In testimony whereof I affix my signature in presence of two witnesses.

ORION TIMOTHY PRISER.

Witnesses:
LERTEN ROWE,
WM. H. WELLBAUN.